United States Patent
Kim et al.

[11] Patent Number: 5,508,338
[45] Date of Patent: Apr. 16, 1996

[54] COMPATIBILIZED BLEND OF POLYCARBONATE, POLYESTER AND LIQUID CRYSTALLINE ADDITIVE

[75] Inventors: Ki-Soo Kim, Katonah, N.Y.; Sophia Dashevsky, Fair Lawn, N.J.

[73] Assignee: Akzo Nobel NV, Arnhem, Netherlands

[21] Appl. No.: 420,265

[22] Filed: Apr. 11, 1995

Related U.S. Application Data

[63] Continuation-in-part of Ser. No. 309,289, Sep. 20, 1994, abandoned.

[51] Int. Cl.⁶ .................................................. C08L 69/00
[52] U.S. Cl. ...................... 524/537; 524/539; 525/439; 525/466
[58] Field of Search .................................. 524/537, 539; 525/439, 466

[56] References Cited

U.S. PATENT DOCUMENTS

| | | | |
|---|---|---|---|
| 5,011,884 | 4/1991 | Rosenau et al. | 524/537 |
| 5,194,569 | 3/1993 | Kim et al. | 528/206 |
| 5,196,488 | 3/1993 | Yang et al. | 525/439 |
| 5,207,967 | 5/1993 | Small, Jr. et al. | 524/537 |
| 5,252,681 | 10/1993 | Yang et al. | 525/439 |
| 5,258,486 | 11/1993 | Kim et al. | 525/437 |
| 5,262,473 | 11/1993 | Cottis et al. | 524/537 |
| 5,367,016 | 11/1994 | Miyama et al. | 524/527 |

FOREIGN PATENT DOCUMENTS

| | | | |
|---|---|---|---|
| 8185645 | 10/1983 | Japan . | |
| 58-185645 | 10/1983 | Japan | C08L 69/00 |
| 0088063 | 5/1985 | Japan . | |
| 60-88063 | 5/1985 | Japan | C08L 69/00 |
| 93/01238 | 1/1993 | WIPO . | |
| WO93/01238 | 1/1993 | WIPO | C08L 7/02 |

OTHER PUBLICATIONS

M. Okamoto et al. "Phase Separation Mechanisn and Structure Development in Poly(butylene terephtalate)/Polycarbonate Blends", Polymer, 1994, vol. 35, No. 2, pp. 257–261.

A. J. Brady et al., "Toughening of Poly(butylane terephtalate) with Core–Shell Impact Modifiers Dispersed with the Aid of Polycarbonate", Polymer, 1994, vol. 35, No. 17, pp. 3665–3672.

*Primary Examiner*—Tae Yoon
*Attorney, Agent, or Firm*—Richard P. Fennelly; Louis A. Morris

[57] ABSTRACT

A single phase, compatiblized blend comprising a polycarbonate resin, a polyester resin, and no more than about 5%, by weight of the combined weight of polycarbonate and polyester, of a liquid crystalline additive as a compatibilizer.

13 Claims, No Drawings

COMPATIBILIZED BLEND OF POLYCARBONATE, POLYESTER AND LIQUID CRYSTALLINE ADDITIVE

This is a continuation-in-part of U.S. Ser. No. 08/309,289, filed Sep. 20, 1994, now abandoned.

BACKGROUND OF THE INVENTION

Blends of polycarbonate resin and a polyester resin, such as poly(butylene terephthalate), commonly phase separate into multiphase polymer compositions. See M. Okamoto et al., Polymer, 1994, Vol. 35, No. 2, pp. 257–261 and A. J. Brady et al., Polymer, 1994, Vol. 35, No. 17, pp. 3665–3672.

Certain recent disclosures exist in the art regarding the use of liquid crystalline polymers as additives for ternary polymer blends which also comprise polycarbonate and polyester resins. In U.S. Pat. No. 5,011,884 to B. Rosenau et al., for example, it is taught that polymeric molding compositions can be formed by adding from 20% to 70% of a thermotropic liquid crystalline polymer to a blend also comprising 10% to 50% of a polycarbonate resin and 10% to 50% of a polyester resin. More recent U.S. Pat. No. 5,262,473 to S. Cottis et al. teaches multiphase polymeric molding compositions comprising polycarbonate and polyester resins in which the blend also contains from 10% to 30% of a thermotropic liquid crystalline polymer which is preferably wholly aromatic in character.

SUMMARY OF THE INVENTION

The present invention relates to a single phase, compatibilized polymer blend comprising polycarbonate resin, polyester resin, and no more than about 5%, by weight of the combined amounts of polycarbonate and polyester resins, of a thermotropic, oligomeric or polymeric liquid crystalline additive.

DETAILED DESCRIPTION OF THE INVENTION

The present invention is applicable for use with blends of conventionally known polycarbonate resins and polyester resins which may each constitute from about 5%:95% to about 95%:5%, respectively, on a weight basis, if the combined amounts of polycarbonate resin and polyester resin are taken into account. Representative polycarbonate resins include those which are based upon the condensation of a polyhydric phenol, such as bisphenol A, with a carbonic acid derivative, such as phosgene as described at Col. 4, lines 51–61 of U.S. Pat. No. 5,262,473, which is incorporated herein by reference for such disclosure. Representative polyester resins include polyethylene terephthalate and polybutylene terephthalate, which is preferred.

One type of liquid crystalline additive which, when added to the forgoing blend of polycarbonate resin and polyester resin to achieve the single phase compatibilized blend of the present invention, is the type of liquid crystalline segmented block copolymer that is described in copending U.S. Ser. No. 53,838, filed Apr. 28, 1993 and in PCT International Publication No. WO 93/01238, Jan. 21, 1993. This segmented block copolymer comprises "rod" and "flexible coil" blocks, respectively. Such a liquid crystalline segmented block copolymer, which is intended to be added to the blend of polycarbonate and polyester resins, can be envisioned to have the general formula:

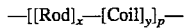

where "Rod" indicates the mesogenic block with x, normally from 2 to 15, indicating the number of mesogen repeats, "Coil" indicates the block comprising a flexible coil polyester segment, for example, with y, normally from about 2 to about 25, indicating the number of repeat units in the flexible polyester block, and p representing the repeat units of rod and coil blocks. The mole % rod in the total polymer can range from about 4% to about 80%. The repeat unit p can range from about 1 to about much larger numbers such as 50– 500 for high molecular weight segmented block copolymers. Polyethylene terephthalate or polybutylene terephthalate comprise the preferred coil segments. The rod length, which is responsible for liquid crystalline properties for the block copolymer additive and the amount of flexible block in the matrix/block copolymer combination need to be appropriately balanced within the general ranges given above.

Generally speaking, the amount of the liquid crystalline copolymer which can be added in accordance with the present invention will only be up to about 5%, by weight of the combined amounts of polycarbonate resin and polyester resin, preferably from about 0.1% to about 3%.

The type of mesogenic unit for the rod portion of the aforementioned type of segmented block copolymer can be appropriately selected from known mesogenic units (main chain thermotropic liquid crystal polymers) including those of the general structure:

$$[-A-Y-X-Z-]_m \quad (1)$$

as set forth in U.S. Pat. No. 4,952,334, for example, which is incorporated herein by reference. In the above formula, for example, in preferred embodiments, X can be $(CH_2)_n$, where n is an integer of from 2 to 10, m can range from about 5 to about 15, and Y and Z can each be —C(O)O— or —C(O)NH— or can be a single bond between two carbon atoms, and A can be p-phenylene, 1,4-, 2,6-, or 1,5-naphthalene, monosubstituted phenylene with methyl, chloro, or phenyl substitution; —ArCH=CHAr—, where Ar is a phenyl ring, —AR—C(O)OAr—, —Ar—C(O)NHAr—, or —ArOC(O)—Ar—C(O)O—Ar—, as more fully depicted in the aforementioned patent. In addition another mesogenic unit which can be employed has the structure —Ar—C(O)—NH—Ar—NH—C(O)—Ar—. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred structure for the "Rod" or mesogenic unit is of the general type described by Ober et al. in Polymer Journal, Vol. 14, No. 1, pp. 9–17 (1982) and, in view of its presence in a block copolymer, as contrasted to the Ober et al. homopolymer, has the structure:

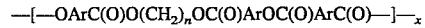

where Ar represents phenyl with para- bond sites, n can range from 2 to 10, e.g., 4 and x can range, for example, from about 5 to about 15. These mesogenic units can be characterized as aromatic ester mesogenic units containing a flexible alkylene spacer. The "triad" structure comprising three linearly-aligned aromatic rings, the bis(p-carboxyphenyl) terephthalate moiety, and a flexible spacer of varying length (n), which can be alkylene or alkylene with heteroatom (e.g., oxygen) interruption, is particularly preferred as depicted above. The mesogenic units generally contain "diad" or "dyad" linkages, —OC(O)ArOC(O)ArC(O)—, at either end adjacent the connection points with the coil block segments. In general, the block copolymers described herein will have a molecular weight of no less than about 7,000 to about 8,000.

Although the particular thermotropic LCP block (e.g., triad with flexible spacer block and polyester block) of structure (I), above, is not a true rigid-rod, it readily assumes an extended chain structure and forms nematic mesophases and consequently high modulus/strength structures. Ideally, the high strength chain extended block polymer molecules would be very finely dispersed in the PET matrix and would be expected to have potential as a high performance molecular composite material.

The foregoing type of thermotropic liquid crystal block copolymer can be synthesized by the process shown in U.S. Ser. No. 53,838, filed Apr. 28, 1993. In the initial step, oligomers of the mesogen are prepared in one reactor and oligomers of the selected polyester are prepared in a second reactor, each set of oligomers having appropriate complementary end groups for later reaction of each set of oligomers. Then, the previously formed oligomers are allowed to react to one another to form the desired block copolymer. In this type of procedure, the sizes of the respective oligomers controls the lengths of the respective blocks.

More preferably, it is synthesized by the one reactor process described and claimed in U.S. Pat. No. 5,194,569, which is incorporated herein by reference. In this one reactor process an α,ω-bis(hydroxybenzoyloxy) alkane is the preferred reagent for reaction with an aromatic acid chloride to form a functionalized liquid crystal oligomer containing the desired mesogenic unit or units and then reacting this oligomer with either a chosen polyester oligomer or the reagents for synthesizing such a polyester oligomer.

The most preferred synthesis procedure is described in U.S. Pat. No. 5,258,486 in which an α,ω-bis(hydroxybenzoyloxy) alkane monomer is reacted with an aromatic acid chloride in the presence of a functionalized flexible coil oligomer under two differing temperature conditions to initially form an acid chloride-terminated bis(hydroxyalkyl terephthalate) oligomer at a first, lower temperature and the desired block copolymer at a second, higher temperature.

In addition to the foregoing type of liquid crystalline copolymer additive, it is within the contemplation of the present invention to utilize the thermotropic liquid crystalline oligomer described and claimed in U.S. Pat. No. 5,418,299 which is incorporated herein by reference. This liquid crystal oligomer is one which, unlike the segmented block copolymer systems just described, is essentially mesogenic in character. It does not contain segments which are similar to the much higher molecular weight, flexible coil polymer blocks contained in that type of segmented liquid crystalline block copolymer. These oligomers are also of generally lower molecular weight than conventional liquid crystalline polymer additives, having a weight average molecular weight of only up to about 7,000, namely from about 1,000 to about 6,000, preferably from about 1,500 to about 4,000.

The present oligomers contain linear polyalkylene spacers rather than comprising wholly cyclic structures (i.e., cycloalkyl, aromatic, etc.). The term "polyalkylene" as used herein is intended to embrace both conventional polyalkylene units, —$(CH_2)_n$—, as well as units comprising these structures which also have oxygen atom interruption. The $T_g$ of the instant oligomers falls below that of liquid crystalline oligomers thereby allowing for thermal mixing of the instant oligomer additive with the substrate resins in the claimed blends at lower temperature.

The type of mesogenic unit for the rod portion of the LC oligomer can be appropriately selected from known mesogenic units in main chain thermotropic liquid crystal polymers, with the proviso that the molecular weight be controlled to yield an oligomer rather than a polymer. Included are those of the general structure:

(I)

as set forth in U.S. Pat. No. 4,952,334, for example, which is incorporated herein by reference. In the above formula, for example, in preferred embodiments, X (the "polyalkylene" spacer) can be $(CH_2)_n$ and $(CH_2CH_2O)_n$, where n is an integer of from 2 to 10, m can range from about 2 to about 10, and Y and Z can each be —C(O)O— or —C(O)NH— or can be a single bond between two carbon atoms, and A can be p-phenylene, 1,4-, 2,6-, or 1,5-naphthylene, monosubstituted phenylene with methyl, chloro, or phenyl substitution; —ArCH=CHAr—, where Ar is a phenyl ring, —Ar—C(O)OAr—, —Ar—C(O)NHAr—, or —ArOC(O)—Ar—C(O)O—Ar—, as more fully depicted in the aforementioned patent. In addition, another mesogenic unit which can be employed has the structure —Ar—C(O)—NH—Ar—NH—C(O)—Ar—. Yet another mesogenic unit can have the formula —ArC(O)OAr'OC(O)Ar— where Ar' can be unsubstituted or substituted (e.g., alkyl or alkoxy) phenyl (derived from hydroquinone) or biphenyl (derived from biphenol) and Ar can be derived from terephthalic or the mesogenic-producing naphthylenic starting materials. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred oligomer has the repeat unit

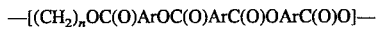

where n can range from 2 to 10, preferably 4, and Ar are para-phenylene.

In the blends of the present invention it is contemplated that the oligomer can be added at up to about 5%, by weight of the blend, preferably up to about 3%.

The oligomers used in the blends of the present invention can be synthesized, for example, by reacting the appropriate building blocks for the desired mesogen (e.g., a terephthaloyl halide and an α-ω-bis(p-hydroxybenzyloxy) alkane) with a slight molar excess of one building block over the other using single digit molar amounts of each, e.g., 4/3 to 7/6. The use of substantially equal molar amounts of reagent will yield excessively large molecular weight materials (i.e. polymers) as will the use of high molar amounts of reagents.

If desired, mixtures of the foregoing liquid crystalline oligomer and liquid crystalline polymer can be used in the present blends.

The following Examples further illustrate the invention.

EXAMPLES 1–3

The Table given below describes three blends that were synthesied from the following components:

PC=Polycarbonate resin (LEXAN LX 105 brand from General Electric Company)

PBT=Polybutylene terphthalate resin (VALOX 315 from General Electric Company)

LCP=A thermotropic liquid crystalline segmented block copolymer of the type described and claimed as an additive for PET resin in U.S. Ser. No. 5,346,970. This liquid crystalline additive comprised the so-called "triad" mesogen unit with a polybutylene spacer and a polybutylene terephthalate flexible coil block. It had an inherent viscosity of 0.5 dl/g.

LCO=A liquid crystalline oligomer of the type described and claimed as an additive in U.S. Ser. No. 156,668, filed Nov. 23, 1993, having a degree of polymerization equal to two and a molecular weight of 1700. It was essentially mesogenic in character and had the so-called "triad" mesogen in its repeat unit with a polybutylene spacer therein.

The respective binary (control) and ternary blends were prepared by dry blending of the components for the blend in powder form by tumbling at 175° C. for four hours under nitrogen and then melt blending in a CSI mixing extruder at 270° C. to 272° C.:

The following Table illustrates the melt flow properties that were observed (the melt flow index (MFI) values, higher values illustrating better flow, being observed at 280° C. and 300° C., respectively, and being given under a load of 1200 g in units of g/10 min.):

| Components | Weight Percents | MFI Values at 280° C. | MFI Values at 300° C. |
|---|---|---|---|
| PC/PBT | 80/20 | 8 | 22 |
| PC/PBT/LCP | 80/20/2 | 9 | 25 |
| PC/PBT/LCO | 80/20/2 | 11 | 31 |

The last two blends, which are in accordance with the present invention show better melt flow values as compared to the control PC/PBT blend.

Scanning electron microscopy analysis of fractured cross sections of blend extrudates indicated that the LCP block copolymer acted as a compatibilizer and was responsible for an improved interfacial adhesion between the polycarbonate and polyester. A microphotograph of the ternary blend containing 2 wt % of the LCP revealed a uniform morphology without voids, porosity or phase separation. A microphotograph of the control binary blend, which did not contain, the LCP showed a "pull-out fiber" phenomenon characteristic of an incompatible, multiphase polymer composition, rather than of a compatible single phase composition.

The scope of the present invention should not be limited by the preceding Examples since they are merely intended to illustrate certain preferred embodiments of the present invention. The scope of protection sought is set forth in the claims which follow.

We claim:

1. A single phase, compatiblized ternary blend comprising a polycarbonate resin, a polyester resin, and no more than about 5%, by weight, based on the combined weights of polycarbonate resin and polyester resin, of an oligomeric or polymeric liquid crystalline additive, as a compatibilizer.

2. A blend as claimed in claim 1 wherein additive is a segmented liquid crystalline block copolymer which comprises up to 500 unit(s) of the general formula:

—[[Rod]$_x$—[Coil]$_y$]— where "Rod" indicates the mesogenic block, with x ranging from 2 to 15 and indicating the number of mesogen repeats, "Coil" indicating the block comprising a flexible coil polyester segment, with y ranging from about 2 to about 25 and indicating the number of repeat units in the flexible polyester block.

3. A blend as claimed in claim 2 wherein the mesogenic unit in the block copolymer is of the general formula:

—[—OArC(O)O(CH$_2$)$_n$OC(O)ArOC(O)ArC(O)—]—$_x$ where Ar represents phenyl with para- bond sites, n is an integer of from 2 to 10, and x is an integer of from about 5 to about 15.

4. A blend as claimed in claim 2 wherein the flexible coil blocks comprise polybutylene terephthalate.

5. A blend as claimed in claim 3 wherein the flexible coil blocks comprise polybutylene terephthalate.

6. A blend as claimed in claim i wherein the additive is a thermotropic, essentially liquid crystalline oligomer comprising aromatic units and at least one linear polyalkylene spacer therein.

7. A blend as claimed in claim 6 wherein the aromatic units are aromatic ester units.

8. A blend as claimed in claim 6 wherein the oligomer comprises three aromatic units.

9. A blend as claimed in claim 6 wherein the polyalkylene spacer comprises from about two to about ten carbon atoms.

10. A blend as claimed in claim 7 wherein the polyalkylene spacer comprises from about two to about ten carbon atoms.

11. A blend as claimed in claim 8 wherein the polyalkylene spacer comprises from about two to about ten carbon atoms.

12. A blend as claimed in claim 6 wherein the oligomer has a weight average molecular weight of no more than about 6,000 and comprises aromatic ester units and a linear polyalkylene spacer.

13. A blend as claimed in claim 12 wherein the oligomer comprises three aromatic groups and wherein the spacer contains from about two to about ten carbon atoms.

* * * * *